(12) United States Patent
Sugashima et al.

(10) Patent No.: US 11,984,002 B2
(45) Date of Patent: May 14, 2024

(54) CONTROL DEVICE, VEHICLE, CONTROL SYSTEM, CONTROL METHOD, AND RECORDING MEDIUM STORING CONTROL PROGRAM

(71) Applicants: TOYOTA JIDOSHA KABUSHIKI KAISHA, Toyota (JP); DENSO CORPORATION, Kariya (JP)

(72) Inventors: Takeshi Sugashima, Kariya (JP); Tokuya Inagaki, Nishio (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 89 days.

(21) Appl. No.: 17/897,414

(22) Filed: Aug. 29, 2022

(65) Prior Publication Data

US 2023/0078212 A1    Mar. 16, 2023

(30) Foreign Application Priority Data

Sep. 15, 2021    (JP) .................................. 2021-150587

(51) Int. Cl.
*G08B 13/22* (2006.01)
*B60Q 9/00* (2006.01)
*B60R 25/34* (2013.01)

(52) U.S. Cl.
CPC ............... *G08B 13/22* (2013.01); *B60Q 9/00* (2013.01); *B60R 25/34* (2013.01)

(58) Field of Classification Search
CPC .... G08B 13/22; G08B 13/19647; B60Q 9/00; B60R 25/34; B60R 25/102
See application file for complete search history.

(56) References Cited

U.S. PATENT DOCUMENTS

| 2018/0053207 | A1* | 2/2018 | Modani | G06Q 30/0244 |
| 2019/0294158 | A1* | 9/2019 | Hokeness | G05B 23/027 |
| 2020/0195472 | A1* | 6/2020 | Tsurumi | H04L 12/40 |
| 2021/0237665 | A1 | 8/2021 | Tamura et al. | |

FOREIGN PATENT DOCUMENTS

JP    2019-125344 A    7/2019

* cited by examiner

*Primary Examiner* — Omeed Alizada
(74) *Attorney, Agent, or Firm* — Oliff PLC

(57) ABSTRACT

A control device comprising a processor, wherein the processor is configured to: acquire a warning level indicating a warning measure related to an abnormality that has occurred in a vehicle, from a device installed externally to the vehicle; detect an abnormality that has occurred in the vehicle, from equipment mounted to the vehicle; perform thinning control on a detection result of the abnormality detected according to the warning level; and transmit the detection result resulting from thinning to the device.

12 Claims, 10 Drawing Sheets

FIG.4

| WARNING LEVEL | DUPLICATION DETECTION RESULT | DEFENSE FUNCTION OPERATION RESULT | IMPORTANT OPERATION DETECTION RESULT | SUSPECTED INTRUSION DETECTION RESULT |
|---|---|---|---|---|
| | | ELEMENT | | |
| HIGH | NO THINNING | NO THINNING | NO THINNING | NO THINNING |
| MEDIUM | THINNING | THINNING | NO THINNING | NO THINNING |
| LOW | THINNING | THINNING | THINNING | NO THINNING |

CONTROL DEVICE, VEHICLE, CONTROL SYSTEM, CONTROL METHOD, AND RECORDING MEDIUM STORING CONTROL PROGRAM

CROSS-REFERENCE TO RELATED APPLICATION

This application is based on and claims priority under 35 USC 119 from Japanese Patent Application No. 2021-150587 filed on Sep. 15, 2021, the disclosure of which is incorporated by reference herein.

BACKGROUND

Technical Field

The present disclosure relates to a control device for controlling information for transmission to a center server, and to a vehicle, control system, control method, and recording medium storing a control program of the same.

Related Art

A vehicle system is disclosed in Japanese Patent Application Laid-Open (JP-A) No. 2019-125344 that notifies a center in cases in which an abnormality has occurred due to cyberattack or the like on a vehicle.

In this vehicle system a seriousness of intrusion is determined based on a predetermined monitoring rule, a notification content to the center server is fixed, and information other than the notification required by the center server is also all transmitted when an intrusion has occurred. This means that, depending on vehicle settings, excessive notification is performed with the center server, resulting in a large communication cost on an onboard device and a large burden on the center server. This results in a concern that information that should be notified will be unable to be notified to the center server according to the circumstances of the vehicle.

SUMMARY

An object of the present disclosure is to provide a control device capable of notifying information that should be notified according to the circumstances of the vehicle, and to provide a vehicle, a control system, a control method, and a recording medium storing control program of the same.

A control device of a first aspect includes a processor, wherein the processor is configured to acquire a warning level indicating a warning measure related to an abnormality that has occurred in a vehicle, from a device installed externally to the vehicle, to detect an abnormality that has occurred in the vehicle, from equipment mounted to the vehicle, to perform thinning control on a detection result of the abnormality detected according to the warning level, and to transmit the detection result resulting from thinning to the device.

In the control device of the first aspect thinning control is performed on the detection result of the abnormality detected according to a warning level indicating a warning measure, and the detection result is transmitted to the device.

Namely, the control device enables notification of information that should be notified according to the circumstances of the vehicle.

A control device of a second aspect is the control device of the first aspect, wherein the warning level is set according to vehicle information including at least one selected from the group consisting of position information related to a position of the vehicle, a failure diagnosis result related to failure of the vehicle, and configuration information related to a configuration of an onboard device mounted to the vehicle.

The control device of the second aspect enables the warning level to be set based on current circumstances of the vehicle.

A control device of a third aspect is the control device of the first aspect or the second aspect, wherein the detection result includes information related to plural abnormalities, and the processor controls thinning information according to a height of the warning level.

The control device of the third aspect enables thinned information, and information to be transmitted without thinning, to be pre-set according to the warning level.

A control device of a fourth aspect is the control device of the third aspect, wherein the processor is configured to transmit the detection result without thinning in a cases in which the warning level is highest.

The control device of the fourth aspect enables all the information detected in the vehicle to be transmitted in circumstances needing the highest warning.

A control device of the fifth aspect is the control device of the third aspect or the fourth aspect wherein the detection result includes a duplication detection result, a defense function-related operation result, an important operation-related detection result, and a suspected intrusion detection result, and the processor is configured to, in a cases in which the warning level is lowest, transmit a detection result resulting from thinning information from the duplication detection result, the defense function-related operation result, and the important operation-related detection result.

The control device of the fifth aspect enables communication to be performed in safe circumstances while taking into consideration the communication cost.

A control device of a sixth aspect is the control device of any one of the first aspect to the fifth aspect wherein the processor is configured to further receive a change to thinning information set for the warning level.

The control device of the sixth aspect enables the thinning information desired by a user to be set for the warning level.

A control device of a seventh aspect is the control device of any one of the first aspect to the sixth aspect wherein the processor is configured to transmit the detection result using wireless communication.

The control device of the seventh aspect enables a detection result to be transmitted even while travelling.

A vehicle of an eighth aspect is mounted with the control device of any one of the first aspect to the seventh aspect and mounted with the equipment connected to the control device.

The vehicle of the eighth aspect enables transmission to the device of information about the vehicle itself.

A control system of a ninth aspect includes the vehicle of the eighth aspect and includes a device configured to receive the detection result from the vehicle. The vehicle transmits, to the device, vehicle information including at least one information selected from the group consisting of position information related to a position of the vehicle, a failure diagnosis result related to failure of the vehicle, and configuration information related to a configuration of an onboard device mounted to the vehicle.

A control system of the ninth aspect enables vehicle information indicating the current circumstances of the vehicle to be transmitted.

The control system of a tenth aspect is the control device of a ninth aspect wherein the device sets the warning level according to the vehicle information received, and transmits the warning level to the vehicle.

The control system of the tenth aspect enables a standard for setting warning levels to be unified using a center server so as not to depend on the vehicle.

A control method of an eleventh aspect includes acquiring a warning level indicating a warning measure related to an abnormality that has occurred in a vehicle, from a device installed externally to the vehicle, detecting an abnormality that has occurred in the vehicle, from equipment mounted to the vehicle, performing thinning control on a detection result of the abnormality detected according to the warning level, and transmitting the detection result resulting from thinning to the device.

The control method of the eleventh aspect performs thinning control on the detection result of the abnormality detected according to the warning level indicating the warning measure, and transmits the detection result to the device. Namely, the control method enables the information that should be notified to be notified according to the circumstances of the vehicle.

A twelfth aspect is a non-transitory recording medium storing a control program. The control program executable by a computer to perform processing comprising. The processing includes acquiring a warning level indicating a warning measure related to an abnormality that has occurred in a vehicle, from a device installed externally to the vehicle, detecting an abnormality that occurred in the vehicle from equipment mounted to the vehicle, performing thinning control on a detection result of the abnormality detected according to the warning level, and transmitting the detection result resulting from thinning to the device.

A computer in which the control program recorded on the non-transitory recording medium of the twelfth aspect is executed performs thinning control on the detection result of the abnormality detected according to the warning level indicating the warning measure, and transmits the detection result to the device. Namely, the computer in which the control program is executed enables the information that should be notified to be notified according to the circumstances of the vehicle.

The present disclosure enables the information that should be notified to be notified according to the circumstances of the vehicle.

BRIEF DESCRIPTION OF THE DRAWINGS

An exemplary embodiment of the present disclosure will be described in detail based on the following figures, wherein:

FIG. 4 is a diagram illustrating thinning setting information according to the present exemplary embodiment;

DETAILED DESCRIPTION

Explanation follows regarding a control system including a control device of the present disclosure. The control device functions as a transmission device to transmit, to a center server, vehicle information indicating a state of a vehicle, and a result of attacks or the like detected on the vehicle. The center server is an example of a "device installed externally".

Figure 1:
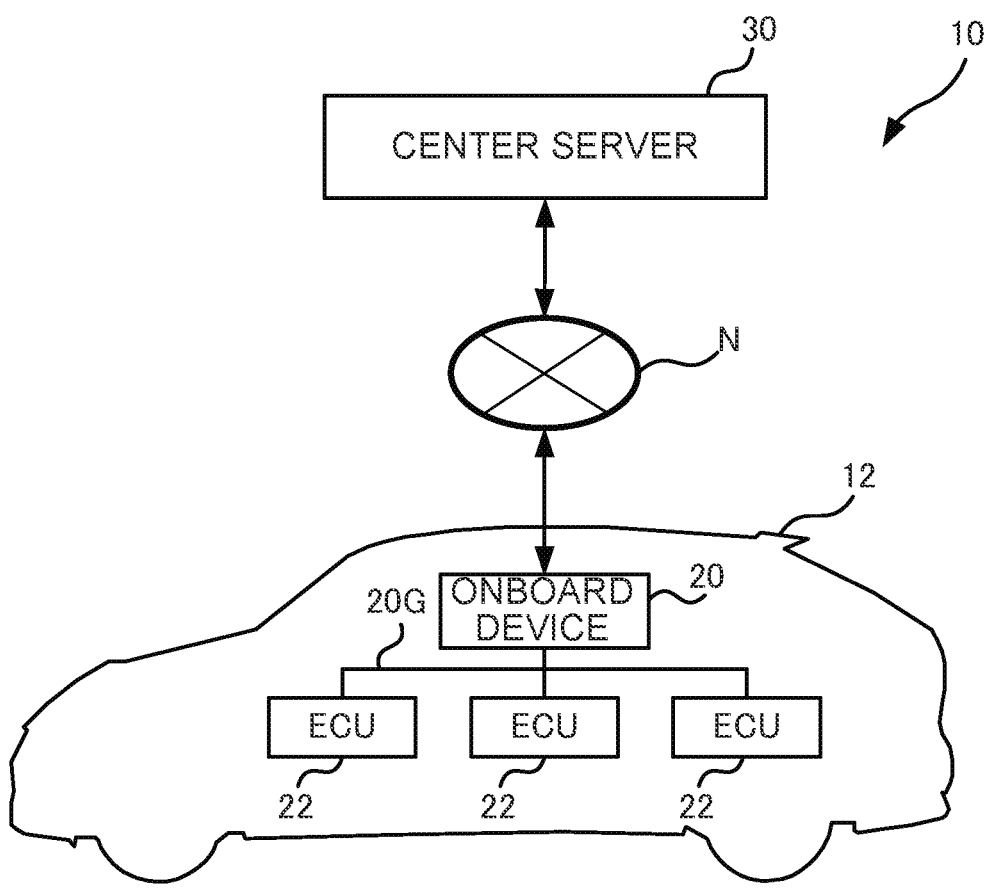
FIG. 1 is a diagram illustrating a schematic configuration of a control system according to an exemplary embodiment.

As illustrated in FIG. 1, a control system 10 of the present exemplary embodiment is configured including a vehicle 12 and a center server 30. The vehicle 12 includes an onboard device 20 serving as a control device, and plural electronic control units (ECU) 22 that are control equipment. The onboard device 20 and the center server 30 are connected together over a network N.

The onboard device 20 includes functions to acquire communication information transmitted from each of the ECUs 22 based on a controller area network (CAN) protocol, and to transmit the communication information to the center server 30.

Examples of the ECUs 22 of the present exemplary embodiment include an advanced driver assistance system (ADAS)-ECU, a steering ECU, an engine ECU, and a body ECU. The onboard device 20 and each of the ECUs 22 are connected together through an external bus 20G.

The center server 30 receives information related to the vehicle 12 from the onboard device 20, and performs monitoring of attacks on the vehicle 12. The center server 30 also acquires vehicle information indicating the state of the vehicle 12, and uses the vehicle information to set a warning level indicating a warning measure related to an abnormality that has occurred in the vehicle 12 and employed for controlling a communication volume according to the circumstances of the vehicle 12, and transmits the warning level to the onboard device 20. The vehicle information referred to here includes position information indicating a position of the vehicle 12, a failure diagnosis result relating to failure in the vehicle 12, and configuration information relating to a configuration of the onboard equipment mounted to the vehicle 12.

Vehicle

Figure 2:
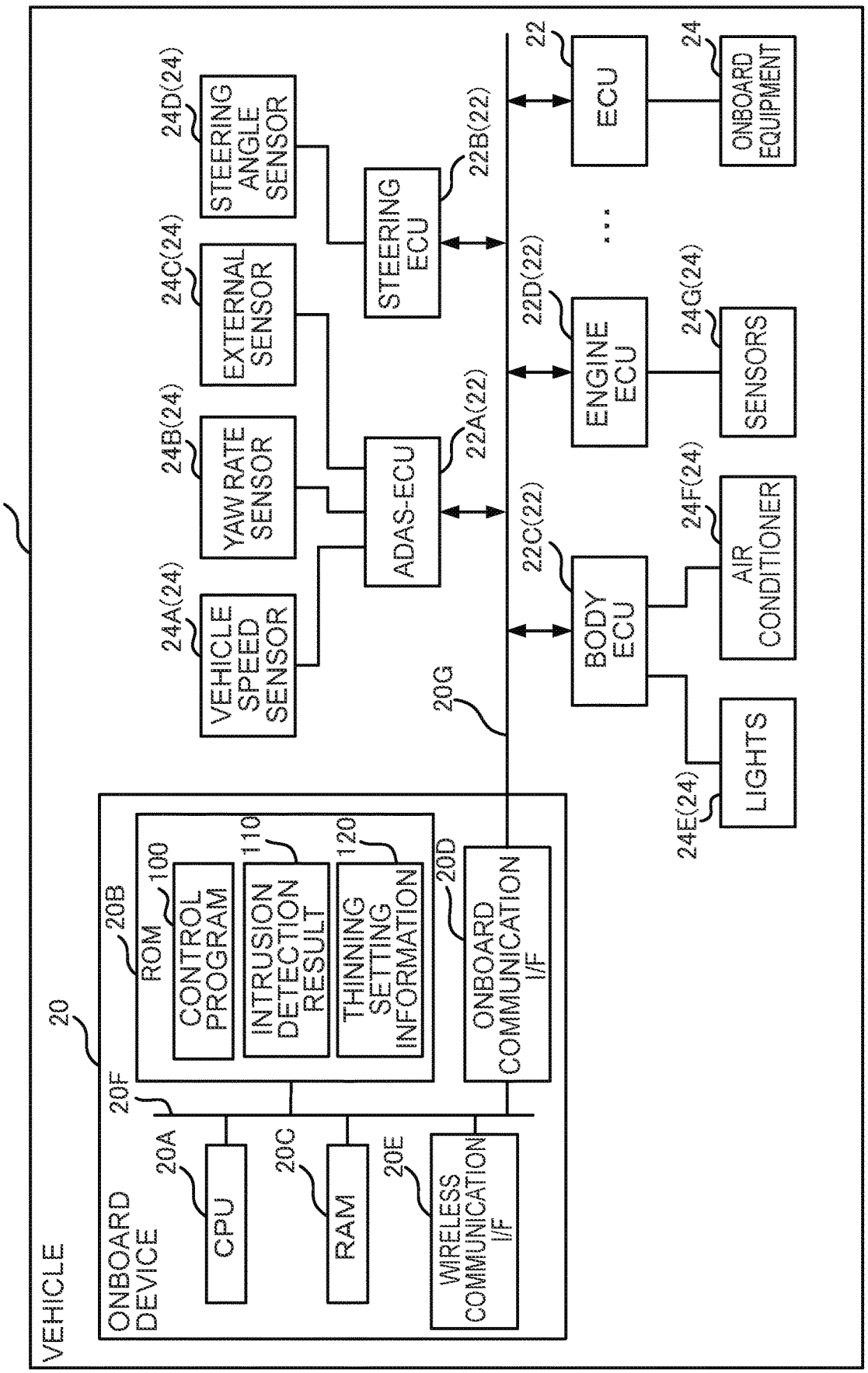
FIG. 2 is a block diagram illustrating a hardware configuration of a vehicle according to the present exemplary embodiment.

As illustrated in FIG. 2, the vehicle 12 according to the present exemplary embodiment is configured including the onboard device 20, the plural ECUs 22, and plural onboard equipment 24.

The onboard device 20 is configured including a central processing unit (CPU) 20A, read only memory (ROM) 20B, random access memory (RAM) 20C, an onboard communication interface (I/F) 20D, and a wireless communication I/F 20E. The CPU 20A, the ROM 20B, the RAM 20C, the onboard communication I/F 20D, and the wireless communication I/F 20E are connected together through an internal bus 20F so as to be able to communicate with each other. The CPU 20A is an example of a processor.

The CPU 20A is a central processing unit that executes various programs and controls each of the sections. Namely, the CPU 20A reads a program from the ROM 20B and executes the program using the RAM 20C as workspace.

The ROM 20B serves as a storage section and is stored with various programs and various data. The vehicle information from the ECUs 22 related to the state and control of the vehicle 12 is collected in the ROM 20B of the present exemplary embodiment, and a control program 100 for controlling transmission of the vehicle information to the center server 30 is also stored in the ROM 20B. An intrusion detection result 110 including abnormal detection information relating to abnormalities detected by the respective ECUs 22 and intrusion information relating to an intrusion to the network of the vehicle 12, and thinning setting information 120 stored with thinning setting information, are both stored in the ROM 20B.

The RAM 20C serves as workspace and is temporarily stored with a program and data.

The onboard communication I/F 20D is an interface for connecting to each of the ECUs 22. A communication standard using a CAN protocol is employed for this interface. The onboard communication I/F 20D is connected to the external bus 20G.

The wireless communication I/F 20E is a wireless communication module for communication with the center server 30. A communication standard such as 5G, LTE, Wi-Fi (registered trademark) is employed, for example, in the wireless communication module. The wireless communication I/F 20E is connected to the network N.

The ECUs 22 include at least an advanced driver assistance system (ADAS)-ECU 22A, a steering ECU 22B, a body ECU 22C, and an engine ECU 22D.

The ADAS-ECU 22A performs overall control of an advanced driver assistance system. A vehicle speed sensor 24A, a yaw rate sensor 24B, and an external sensor 24C that configure the onboard equipment 24 are connected to the ADAS-ECU 22A, The external sensor 24C is a sensor group employed to detect the peripheral environment of the vehicle 12. The external sensor 24C includes, for example, a camera to image the surroundings of the vehicle 12, a millimeter wave radar to transmit probe waves and receive reflected waves, and a laser imaging detection and ranging (LIDAR) for scanning in front of the vehicle 12.

The steering ECU 22B controls power steering. A steering angle sensor 24D) configuring the onboard equipment 24 is connected to the steering ECU 22B. The steering angle sensor 24D) is a sensor for detecting the steering angle of a steering wheel.

The body ECU 22C controls respective body sections of the vehicle 12. Lights 24E and an air conditioner 24F configuring the onboard equipment 24 are connected to the body ECU 22C. The body ECU 22C collects, as vehicle information, the position information indicating a position of the vehicle 12, the failure diagnosis result of the vehicle 12, and the configuration information of the vehicle 12, and stores this vehicle information.

The engine ECU 22D controls an engine of the vehicle 12. Sensors 24G configuring the onboard equipment 24 are connected to the engine ECU 22D. The sensors 24G include an oil temperature sensor for measuring the temperature of the engine oil, an oil pressure sensor for measuring the pressure of the engine oil, and a rev sensor for detecting the engine rev count.

The control program 100 is a program for controlling the onboard device 20.

Figure 3:
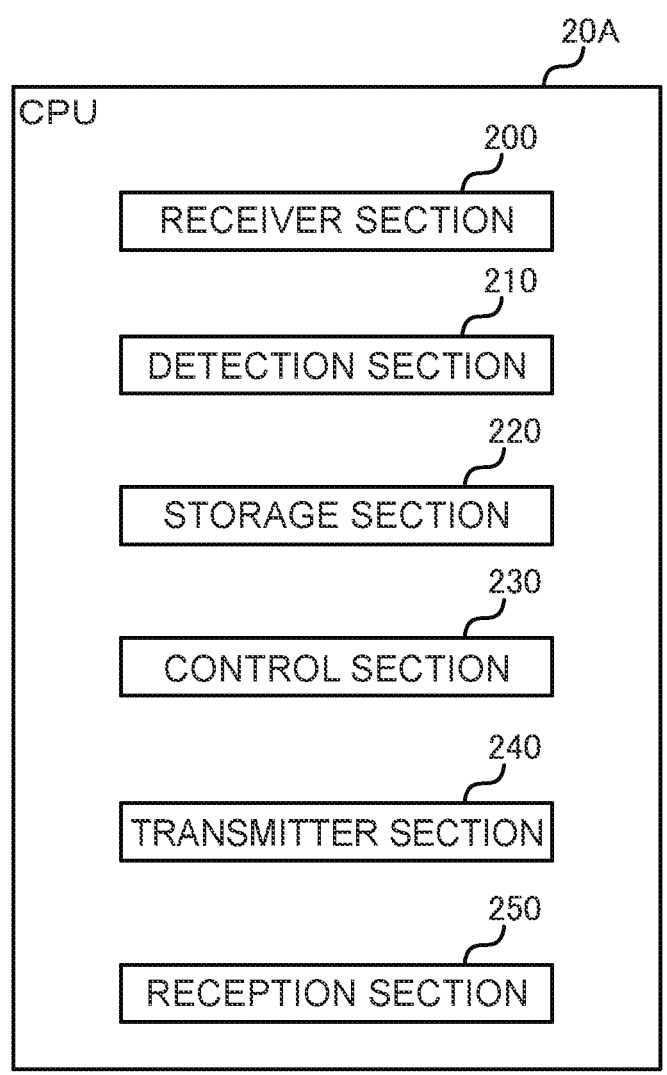
FIG. 3 is a block diagram illustrating a functional configuration of an onboard device according to the present exemplary embodiment.

As illustrated in FIG. 3, in the onboard device 20 of the present exemplary embodiment, the CPU 20A executes the control program 100 so as to function as a receiver section 200, a detection section 210, a storage section 220, a control section 230, a transmitter section 240, and a reception section 250.

The receiver section 200 receives the warning level from the center server 30.

The detection section 210 collects abnormal detection information detected by the respective ECUs 22 of the vehicle 12, and detects intrusion information indicting intrusion to the network in the vehicle 12.

The storage section 220 stores the intrusion detection result 110 including the abnormal detection information and the intrusion information. The intrusion detection result 110 includes elements of a duplication detection result, a defense function-related operation result, an important operation-related detection result, and a suspected intrusion detection result. For example, the duplication detection result indicates information such as a detection result of a prolonged DoS attack to a specific identification (ID), a port scan to an unauthorized port, and the like. The defense function-related operation result indicates information such as discarding of abnormal packets by a firewall, authentication errors, and the like. The important operation-related detection result indicates information such as diagnostic communication, re-programming and updating of security keys, and the like. The suspected intrusion detection result indicates information such as frequent abnormal packet discarding in the network of the vehicle 12, message authentication errors, and the like.

The control section 230 executes thinning processing to thin the information from the intrusion detection result 110 stored in the storage section 220 according to the warning level received by the receiver section 200. The control section 230 thins information for predetermined elements in the intrusion detection result according to the warning level set in the thinning setting information illustrated, for example, in FIG. 4. For example, as illustrated in FIG. 4, in cases in which the warning measure is at the highest warning level "HIGH", the control section 230 sets, as the intrusion detection result, no thinning of the information for the elements related to the duplication detection result, the defense function operation result, the important operation detection result, and the suspected intrusion detection result. Moreover, in cases in which the warning level is "MEDIUM", the control section 230 sets, as the intrusion detection result, thinning of the information of the elements related to the duplication detection result and the defense function operation result, but no thinning for the information of the elements related to the important operation detection result and the suspected intrusion detection result. In cases in which the warning measure is the lowest warning level "LOW", the control section 230 sets, as the intrusion detection result, thinning of the information of the elements related to the duplication detection result, the defense function operation result, and the important operation detection result, but no thinning of the information of the elements related to the suspected intrusion detection result. Namely, the control section 230 performs thinning processing to thin the information of the elements according to the height of the warning level from the intrusion detection result.

The transmitter section 240 transmits the intrusion detection result subjected to the thinning processing by the control section 230 to the center server 30. The transmitter section 240 transmits the vehicle information acquired from the ECUs 22 to the center server 30.

The reception section 250 receives changes to the thinning setting information 120. Specifically, the reception section 250 receives changes to the settings for "thinning" or "no-thinning" for each warning levels and each of the elements in the thinning setting information 120 illustrated in FIG. 4. The reception section 250 may receive changes to the thinning setting information 120 by user operation of the onboard device 20, or may receive changes to the thinning setting information 120 by receiving settings from the center server 30 for each warning levels and each of the elements. The reception section 250 may receive settings for new elements and add these to the thinning setting information 120.

Center Server

Figure 5:
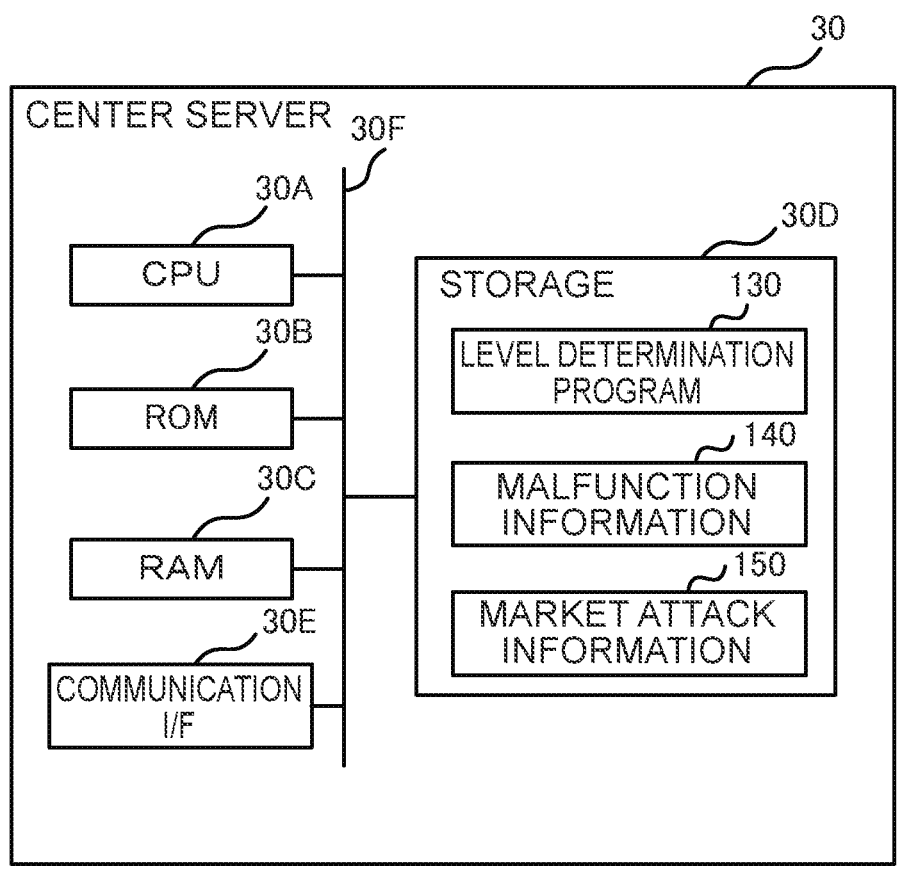
FIG. 5 is a block diagram illustrating a hardware configuration of a center server according to the present exemplary embodiment.

As illustrated in FIG. 5, the center server 30 is configured including a CPU 30A, ROM 30B, RAM 30C, storage 30D, and a communication I/F 30E. The CPU 30A, the ROM 30B, the RAM 30C, the storage 30D, and the communication I/F 30E are connected together through an internal bus 30F so as to be able to communicate with each other. The functions of the CPU 30A, the ROM 30B, the RAM 30C, and the communication I/F 30E are the same as those of the CPU 20A, the ROM 20B, the RAM 20C, and the wireless communication I/F 20E in the onboard device 20 described above. However note that the communication I/F 30E may perform wired communication.

The storage 30D serving as a storage section is configured by a hard disk drive (HDD) or solid state drive (SSD), and stores various programs and various data. The storage 30D of the present exemplary embodiment is stored with a level determination program 130, malfunction information 140, and market attack information 150. Note that the ROM 30B may also store the level determination program 130.

The level determination program 130 is a program for setting the warning level. The malfunction information 140 is information related to the vehicle 12, such as configuration of onboard equipment 24 with vulnerabilities, and information related to malfunctions present in the onboard equipment 24 mounted to the vehicle 12. The market attack information 150 is information related to hotspots such as danger areas and the like.

Figure 6:
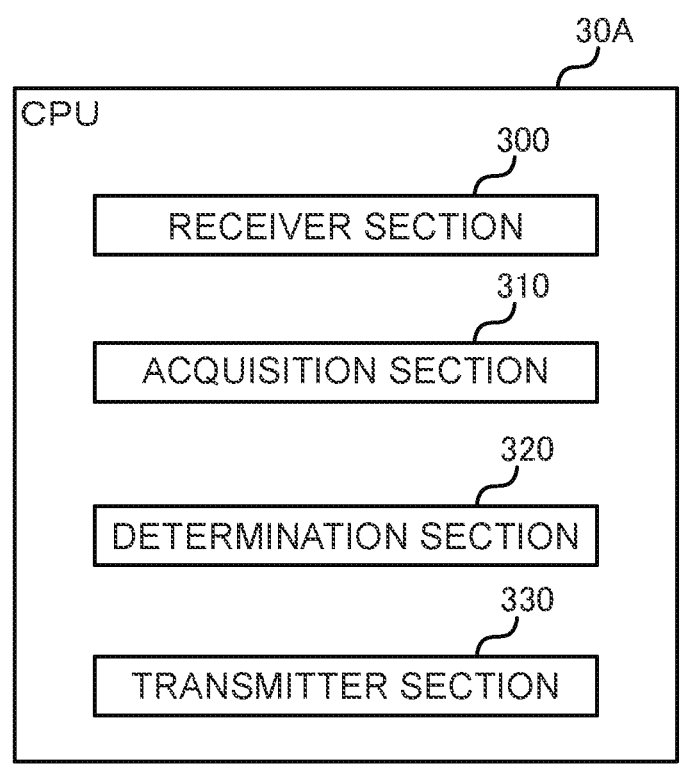
FIG. 6 is a block diagram illustrating a functional configuration of a center server according to the present exemplary embodiment.

As illustrated in FIG. 6, in the center server 30 of the present exemplary embodiment, the CPU 30A functions as a receiver section 300, an acquisition section 310, a determination section 320, and a transmitter section 330 by executing the level determination program 130.

The receiver section 300 receives an intrusion detection result and vehicle information from the onboard device 20.

The acquisition section 310 acquires the stored malfunction information 140 and the market attack information 150.

The determination section 320 uses the malfunction information 140 and the market attack information 150 to determine the warning level for the received vehicle information. For example, the determination section 320 uses the failure diagnosis information contained in the vehicle information to determine whether or not there is a suspicion of failure. The determination section 320 moreover compares the configuration information contained in the vehicle information against configuration with vulnerabilities contained in the malfunction information 140, and determines whether or not there is a configuration with suspected vulnerabilities in the vehicle 12. The determination section 320 also compares the position information contained in the vehicle information against hotspot-related information contained in the market attack information 150, and determines whether or not the vehicle 12 is present in a danger area.

The transmitter section 330 transmits the warning level thereby determined to the onboard device 20.

Figure 7:
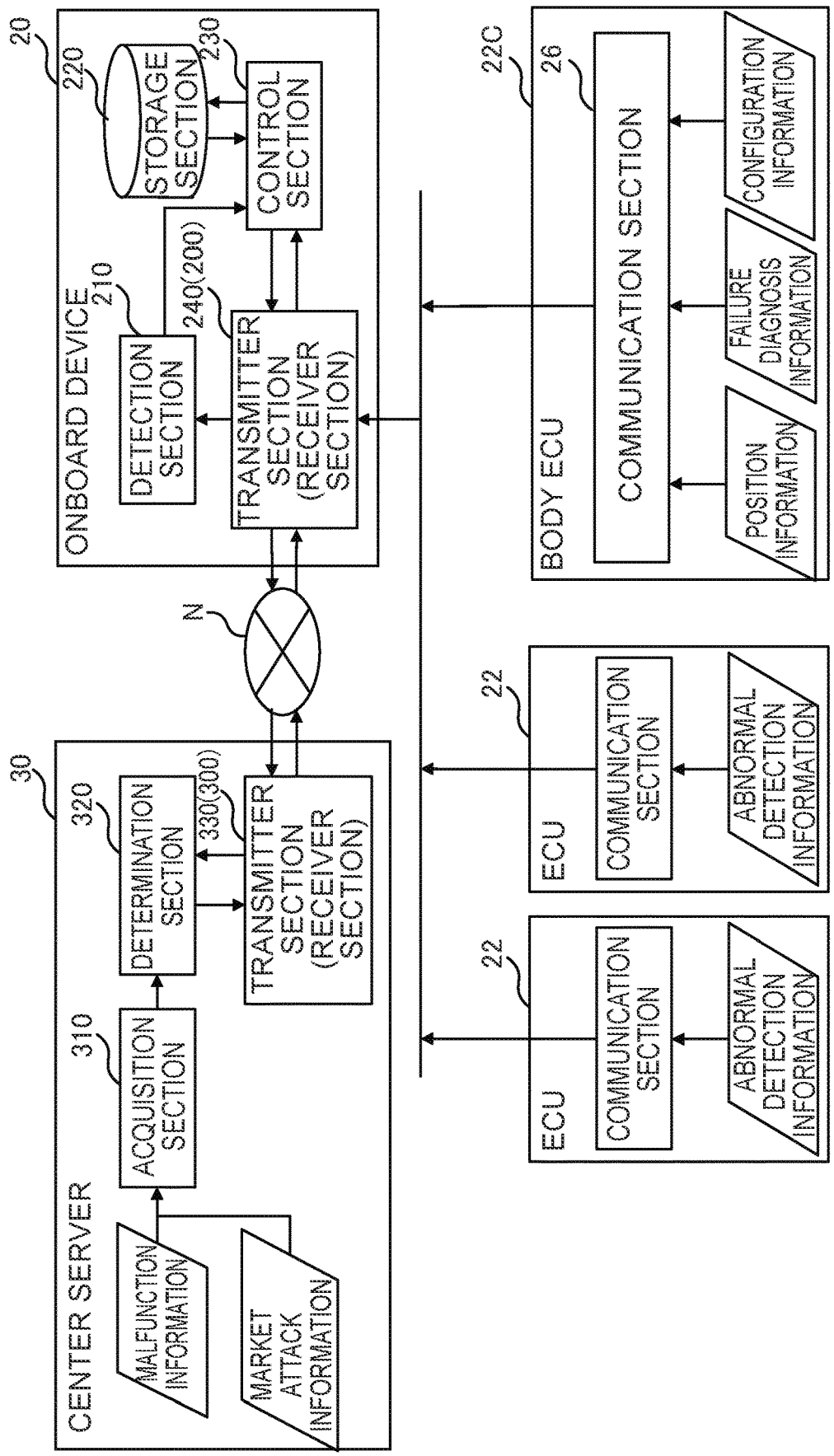
FIG. 7 is a dataflow diagram illustrating a flow of data in a control system according to the present exemplary embodiment.

Next, prior to explaining the operation of the control system 10, explanation follows regarding a flow of data in the control system 10, with reference to FIG. 7. FIG. 7 is a data flowchart illustrating an example of a flow of data in the control system 10.

The body ECU 22C transmits the vehicle information containing the stored position information of the vehicle itself, the failure diagnosis information, and the configuration information through a communication section 26 to the onboard device 20.

The receiver section 200 in the onboard device 20 receives the vehicle information from the body ECU 22C, and the transmitter section 240 transmits the vehicle information to the center server 30 over the network N.

The receiver section 300 in the center server 30 receives the vehicle information, and the transmitter section 330 transmits the vehicle information to the determination section 320. The acquisition section 310 acquires the malfunction information 140 and the market attack information 150, and inputs these to the determination section 320. The determination section 320 employs the acquired malfunction information 140 and market attack information 150 to determine the warning level for the vehicle information, and inputs the determined warning level to the receiver section 300, and the transmitter section 330 transmits the warning level to the onboard device 20.

The receiver section 200 in the onboard device 20 receives the warning level, and the transmitter section 240 transmits the warning level to the control section 230. The control section 230 sets the transmitted warning level.

After the warning level has been set, the receiver section 200 receives abnormal detection information from each of the ECUs 22, and the transmitter section 240 transmits the abnormal detection information to the detection section 210. The detection section 210 collects the abnormal detection information, uses the abnormal detection information to detect intrusion information indicating an intrusion to the network for the vehicle 12, and inputs the abnormal detection information and the intrusion information to the control section 230 as an intrusion detection result.

The control section 230 inputs the intrusion detection result to the storage section 220, and the storage section 220 stores the intrusion detection results. The control section 230 acquires the intrusion detection result from the storage section 220 at a specific opportunity, thins information from the intrusion detection result according to the set warning level, and transmits the thinned intrusion detection result to the receiver section 200.

The receiver section 200 receives the intrusion detection result, and the transmitter section 240 transmits the intrusion detection result to the center server 30.

Control Flow

Figure 8:
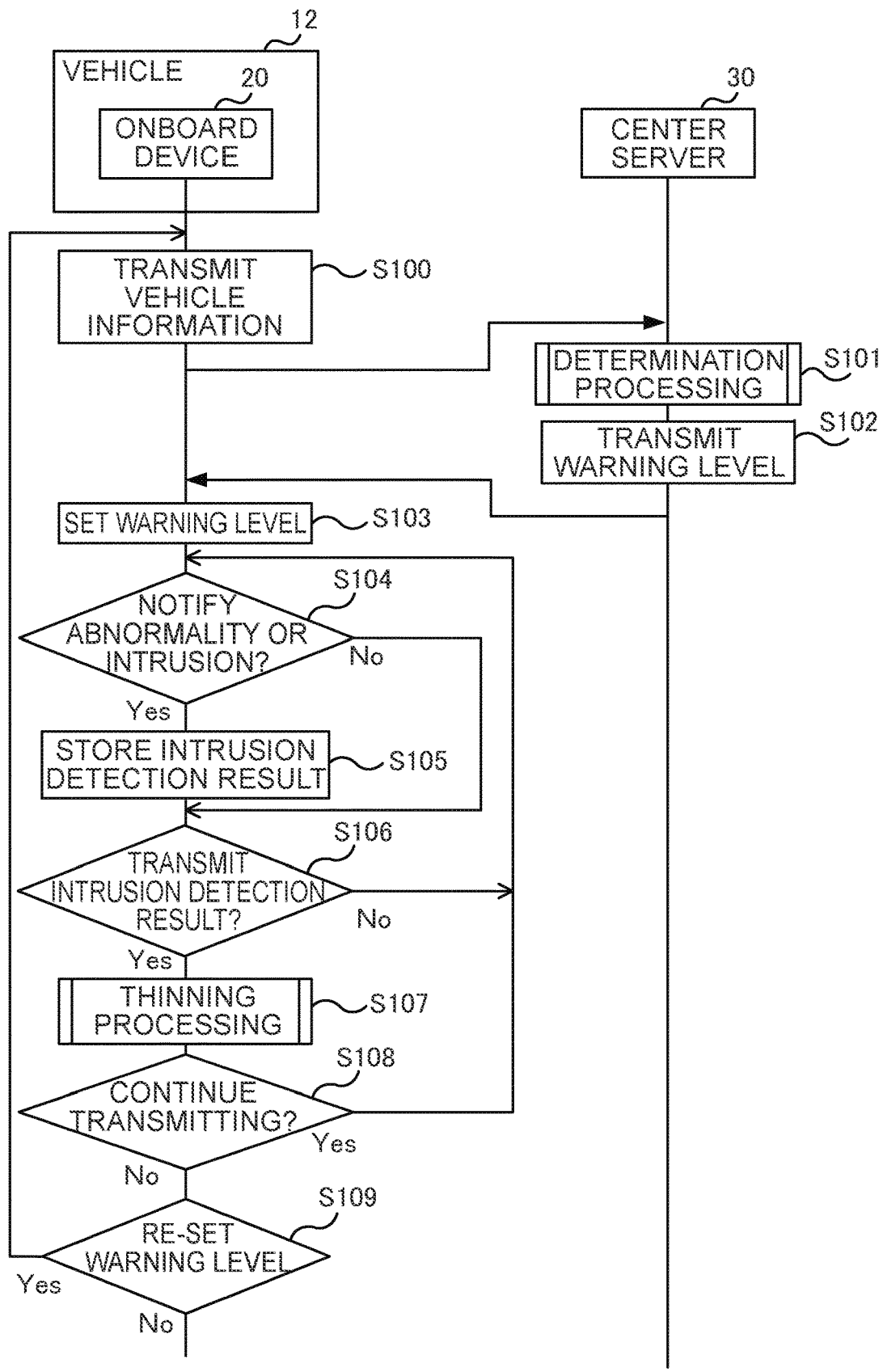
FIG. 8. is a sequence chart illustrating a flow of processing executed in an agent system according to the present exemplary embodiment.
Figure 9:
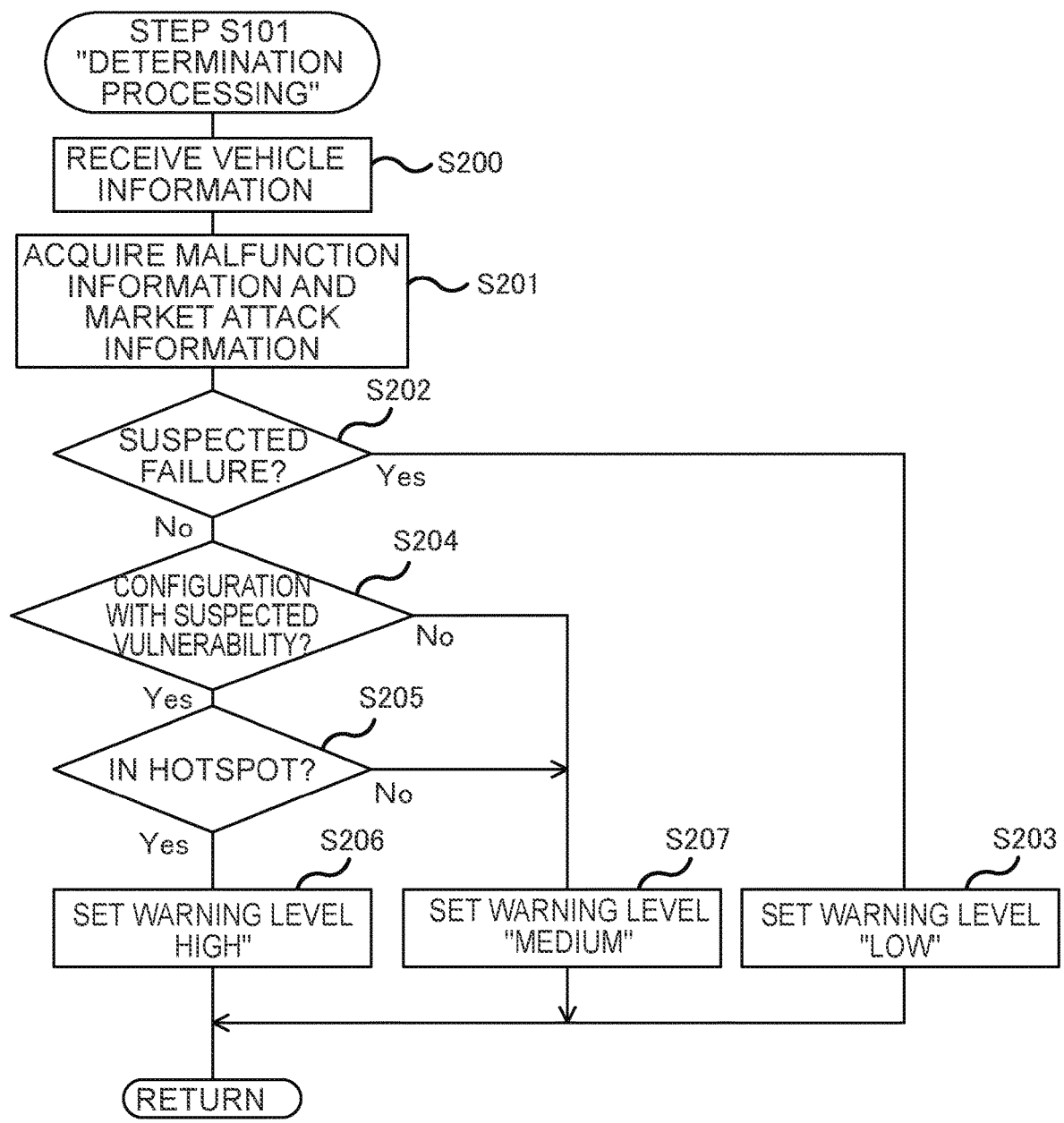
FIG. 9 is a flowchart illustrating a flow of processing executed in a center server according to the present exemplary embodiment.
Figure 10:
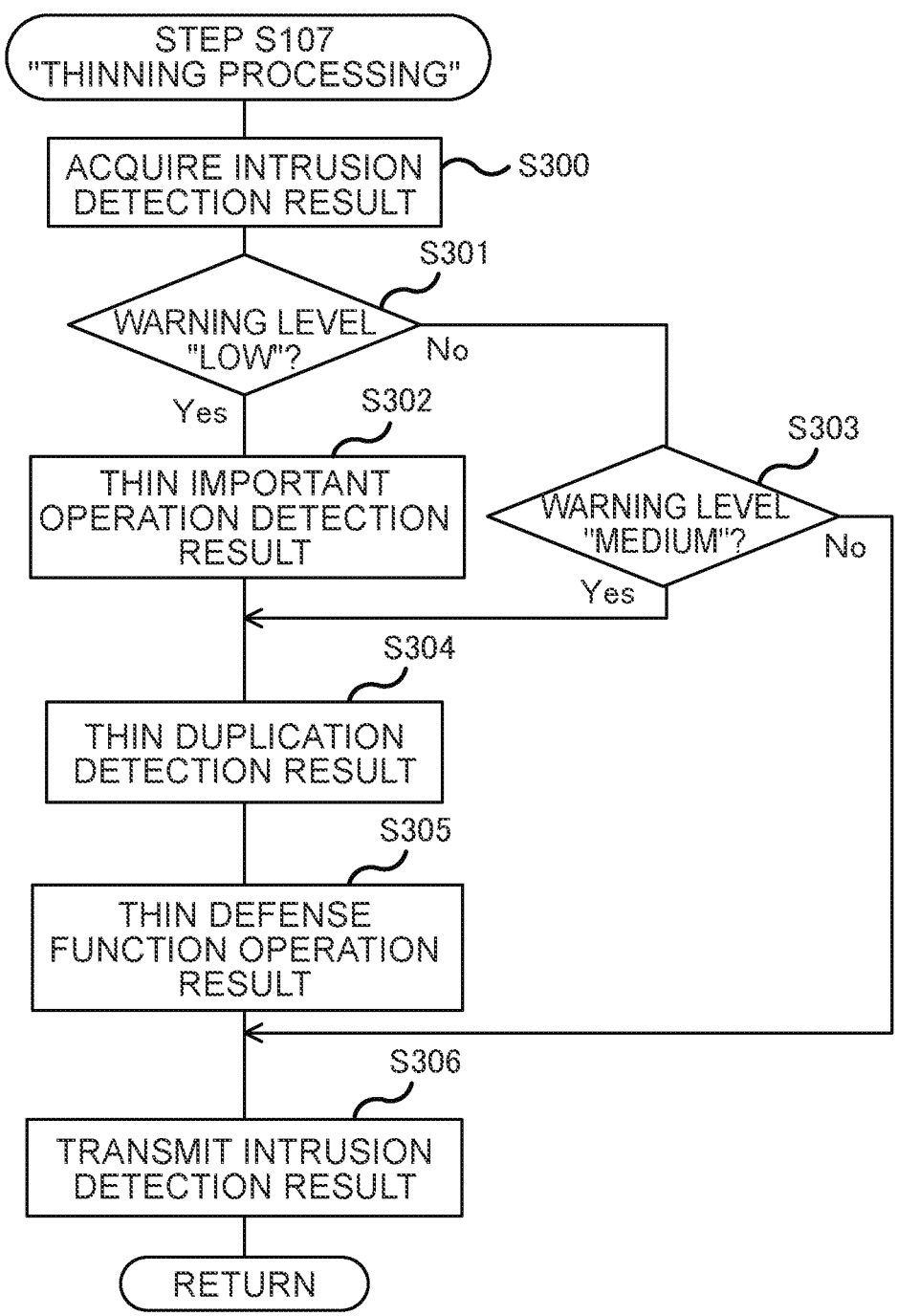
FIG. 10 is a flowchart illustrating a flow of processing executed in a control device according to the present exemplary embodiment.

Next, description follows regarding a flow of processing in the control system 10 executed by cooperation between the onboard device 20 and the center server 30, with reference to FIG. 8, FIG. 9, and FIG. 10. FIG. 8 is a sequence chart illustrating an example of a flow of processing of the control system 10 of the present exemplary embodiment. The control processing in the onboard device 20 is implemented by the CPU 20A executing the control program 100 so as to function as the receiver section 200, the detection section 210, the storage section 220, the control section 230, the transmitter section 240, and the reception section 250. The determination processing in the center server 30 is implemented by the CPU 30A functioning as the receiver section 300, the acquisition section 310, the determination section 320, and the transmitter section 330.

As illustrated in the example of FIG. 8, the onboard device 20 transmits the vehicle information to the center server 30 (step S100).

The center server 30 receives vehicle information, executes the warning level determination processing (step S101), and transmits the warning level thereby determined to the onboard device 20 (step S102). The determination processing is described in detail later, with reference to FIG. 9.

The onboard device 20 sets the received warning level (step S103), and performs determination as to whether or not there is abnormality or intrusion detected in each of the ECUs 22 (step S104). In cases in which an abnormality or intrusion is detected (step S104: YES), the onboard device 20 stores the abnormal detection information and the intrusion information as an intrusion detection result (step S105). However, in cases in which no abnormality or intrusion is detected (step S104: NO), the onboard device 20 performs determination as to whether or not to transmit the intrusion detection result.

The onboard device 20 determines whether or not to transmit the intrusion detection result to the center server 30 (step S106). The onboard device 20 executes thinning processing (step S107) in cases in which the intrusion detection result is to be transmitted to the center server 30 (step S106: YES). The onboard device 20 performs determination as to whether or not an abnormality or intrusion has been detected (step S104) in cases in which the intrusion detection result is not to be transmitted to the center server 30 (step S106: NO). The thinning processing is described in detail later, with reference to FIG. 10.

The onboard device 20 performs determination as to whether or not to continue processing for transmitting the intrusion detection result to the center server 30 (step S108). The onboard device 20 transitions to step S104 and performs determination as to whether or not an abnormality or intrusion has been detected in cases in which processing for transmitting the intrusion detection result to the center server 30 continues (step S108: YES). However, the onboard device 20 transitions to step S109 and performs determination as to whether or not to reset the warning level (step S109) in cases in which processing for transmitting the intrusion detection result to the center server 30 does not continue (step S108: NO). The onboard device 20 transitions to step S100 and transmits the vehicle information to the center server 30 in cases in which the warning level is reset (step S109: YES).

Next, description follows regarding a flow of determination processing executed in the center server 30 of the present exemplary embodiment, with reference to FIG. 9.

At step S200, the CPU 30A receives the vehicle information from the onboard device 20 of the vehicle 12.

At step S201, the CPU 30A acquires the malfunction information 140 and the market attack information 150 stored in the storage 30D.

At step S202, the CPU 30A employs the failure diagnosis information related to the vehicle information to perform determination as to whether or not there is a suspected failure in the vehicle 12. The CPU 30A transitions to step S203 in cases in which there is a suspected failure (step S202: YES). However, the CPU 30A transitions to step S204 in cases in which there is no suspected failure (step S202: NO).

At step S203, the CPU 30A sets the warning level to "LOW". In cases in which there is a suspected failure in the vehicle 12, the warning level "LOW" is set to restrict the communication volume because there are doubts and a lack of reliability in the information acquired from the failed vehicle 12.

At step S204, the CPU 30A employs the malfunction information 140 and the configuration information related to the vehicle information to perform determination as to whether or not the configuration of the vehicle 12 includes configuration with suspected vulnerabilities. The CPU 30A transitions to step S205 in cases in which the configuration has suspected vulnerabilities (step S204: YES). However, the CPU 30A transitions to step S207 in cases in which the configuration does not have suspected vulnerabilities (step S204: NO).

At step S205, the CPU 30A employs the market attack information 150 and the position information related to the vehicle information to perform determination as to whether or not the vehicle 12 is presently positioned in a hotspot. The CPU 30A transitions to step S206 when at a hotspot (step S205: YES). The CPU 30A transitions to step S207 when not at a hotspot (step S205: NO).

At step S206, the CPU 30A sets the warning level to "HIGH".

At step S207, the CPU 30A sets the warning level to "MEDIUM".

Next, description follows regarding a flow of thinning processing executed in the onboard device 20 of the present exemplary embodiment, with reference to FIG. 10.

At step S300 the CPU 20A acquires the intrusion detection result from the storage section 220.

At step S301, the CPU 20A performs determination as to Whether or not the set warning level is the warning level "LOW". The CPU 20A transitions to step S302 in cases in which the warning level is "LOW" (step S301: YES). However, the CPU 20A transitions to step S303 in cases in which the warning level is not "LOW" (step S301: NO).

At step S302, the CPU 20A thins the information of the elements related to the intrusion detection result of the important operation from the intrusion detection result.

At step S303, the CPU 20A determines whether or not the warning level set is the warning level "MEDIUM". The CPU 20A transitions to step S304 in cases in which the warning level is "MEDIUM" (step S303: YES). However, the CPU 20A transitions to step S306 in cases in which the warning level is not "MEDIUM" (step S303: NO).

At step S304, the CPU 20A thins the information of the elements related to intrusion detection result for duplication from the intrusion detection result.

At step S305, the CPU 20A thins the information of the elements related to the defense function operation results from the intrusion detection result.

At step S306, the CPU 20A transmits the intrusion detection result to the center server 30.

SUMMARY

The onboard device 20 of the present exemplary embodiment acquires a warning level indicating a warning measure related to an abnormality that has occurred in the vehicle 12 from the center server 30 installed externally to the vehicle 12. The onboard device 20 detects an abnormality that has occurred in the vehicle 12 from the ECUs 22 mounted in the vehicle 12, and performs control to thin the abnormality detected detection results according to this warning level, and transmits the thinned detection results to the center server 30.

The present exemplary embodiment enables information that should be notified to be notified according to the circumstances of the vehicle 12.

Remarks

Note that the present exemplary embodiment an example has been described of a mode in which the onboard device 20 mounted to the vehicle 12 performs communication with the center server 30 through the wireless communication I/F 20E. However, there is no limitation thereto. The onboard device 20 may perform communication with the center server 30 via a data communication module (DCM), and may switch between the wireless communication 20E and the DCM according to this warning level to perform communication with the center server 30. The DCM is connected to an antenna, and performs wireless communication via a mobile phone network with the center server 30 in accordance with a network communication standard, such as 5G, LTE, and Wi-Fi (registered trademark). For example, the onboard device 20 may perform communication with the center server 30 through the wireless communication I/F 20E in cases in which the warning level is "LOW" or the warning level is "MEDIUM", and may perform communication with the center server 30 via the DCM connected to a detected line in cases in which the warning level is "HIGH".

Note that the various type of processing executed in the present exemplary embodiment by the CPU 20A and the CPU 30A reading and executing software (programs) may be executed by various processors other than a CPU. Examples of such processors include programmable logic devices (PLD) that allow circuit configuration to be modified post-manufacture, such as a field-programmable gate array (FPGA), and dedicated electronic circuits, these being processors including a circuit configuration custom-designed to execute specific processing, such as an application specific integrated circuit (ASIC). Moreover, the processing described above may be executed by any one of these various types of processors, or may be executed by a combination of two or more of the same type or different types of processors (such as plural FPGAs, or a combination of a CPU and an FPGA). The hardware structure of these various types of processors is more specifically an electric circuit combining circuit elements such as semiconductor elements.

In the present exemplary embodiment described above a mode has been explained in which each of the programs is pre-stored (installed) on a computer readable non-transitory recording medium. For example, the control program 100 in the CPU 20A is pre-stored in the ROM 20B, and the level determination program 130 in the CPU 30A is pre-stored in the storage 30D. However, there is no limitation thereto, and each of the programs may be provided in a format recorded on a non-transitory recording medium such as a compact disc read only memory (CD-ROM), a digital versatile disc read only memory (DVD-ROM), and a universal serial bus (USB) memory. Moreover, the programs may be in a format for download from an external device over a network.

What is claimed is:

1. A control device comprising a processor, wherein the processor is configured to:

acquire a warning level indicating a warning measure related to an abnormality that has occurred in a vehicle, from a device installed externally to the vehicle;

detect an abnormality that has occurred in the vehicle, from equipment mounted to the vehicle;

perform thinning control on a detection result of the abnormality detected according to the warning level;

transmit the detection result resulting from thinning to the device, the detection result including a duplication detection result, a defense function-related operation result, an important operation-related detection result, and a suspected intrusion detection result; and in a case in which the warning level is lowest, transmit a detection result resulting from thinning information from the duplication detection result, the defense function-related operation result, and the important operation-related detection result.

2. The control device of claim 1, wherein the warning level is set according to vehicle information including at least one selected from the group consisting of position information related to a position of the vehicle, a failure diagnosis result related to failure of the vehicle, and configuration information related to a configuration of an onboard device mounted to the vehicle.

3. The control device of claim 1, wherein:

the detection result includes information related to a plurality of abnormalities; and the processor controls thinning information according to a height of the warning level.

4. The control device of claim 3, wherein the processor is configured to transmit the detection result without thinning in a case in which the warning level is highest.

5. The control device of claim 1, wherein the processor is configured to further receive a change to thinning information set for each warning level.

6. The control device of claim 1, wherein the processor is configured to transmit the detection result using wireless communication.

7. The control device of claim 1, wherein the processor is configured to: communicate based on a plurality of communication protocols for transmitting the detection result to the device; and change a selected one of the communication protocols according to the warning level.

8. A vehicle comprising:

the control device of claim 1 mounted to the vehicle; and the equipment mounted to the vehicle and connected to the control device.

9. A control system comprising:

the vehicle of claim 8; and a device configured to receive the detection result from the vehicle, wherein the vehicle transmits, to the device, vehicle information including at least one selected from the group consisting of position information related to a position of the vehicle, a failure diagnosis result related to failure of the vehicle, and configuration information related to a configuration of an onboard device mounted to the vehicle.

10. The control system of claim 9, wherein the device:

sets the warning level according to the received vehicle information; and transmits the warning level to the vehicle.

11. A control method comprising: acquiring a warning level indicating a warning measure related to an abnormality that has occurred in a vehicle, from a device installed externally to the vehicle; detecting an abnormality that has occurred in the vehicle, from equipment mounted to the vehicle; performing thinning control on a detection result of the abnormality detected according to the warning level; and transmitting the detection result resulting from thinning to the device, the detection result including a duplication detection result, a defense function-related operation result, an important operation-related detection result, and a suspected intrusion detection result; and given that the warning level is lowest, transmitting a detection result resulting from thinning information from the duplication detection result, the defense function-related operation result, and the important operation-related detection result.

12. A non-transitory recording medium storing a control program executable by a computer to perform processing, the processing comprising: acquiring a warning level indicating a warning measure related to an abnormality that has occurred in a vehicle, from a device installed externally to the vehicle; detecting an abnormality that has occurred in the vehicle, from equipment mounted to the vehicle; performing thinning control on a detection result of the abnormality detected according to the warning level; and transmitting the detection result resulting from thinning to the device, the detection result including a duplication detection result, a defense function-related operation result, an important operation-related detection result, and a suspected intrusion detection result; and given that the warning level is lowest, transmitting a detection result resulting from thinning information from the duplication detection result, the defense function-related operation result, and the important operation-related detection result.

* * * * *